United States Patent [19]

Fooladi

[11] 3,972,824

[45] Aug. 3, 1976

[54] METHOD FOR CLEANING NITROGEN OXIDES FROM AIR

[75] Inventor: Mike M. Fooladi, Vicksburg, Miss.

[73] Assignee: Vicksburg Chemical Co., Vicksburg, Miss.

[22] Filed: Sept. 25, 1974

[21] Appl. No.: 509,128

[52] U.S. Cl. .................................. 252/364; 55/68; 55/69; 55/244; 252/171
[51] Int. Cl.² .................... B01D 53/00; B01D 47/02
[58] Field of Search ................. 252/364, 171, 184; 55/68, 69, 244; 423/226

[56] References Cited
UNITED STATES PATENTS 3,728,269    4/1973    Stephenson et al. ................. 252/364

OTHER PUBLICATIONS

Azeotropic Data, American Chemical Society, 1952, pp. 28, 262, 263.

Mellon, Industrial Solvents, Reinhold, 1950, pp. 71, 73, 75, 77.

*Primary Examiner*—Benjamin R. Padgett
*Assistant Examiner*—Irwin Gluck

[57]    ABSTRACT

Nitrogen oxides mixed with air or other gases is cleaned from such air or other gases by treatment thereof with a mixture composed essentially of chloroform, methyl alcohol, ethyl alcohol, and N-hexane. The composition of the mixture may include isopropyl alcohol in place of methyl alcohol, or it may include in addition to the chloroform and the N-hexane, a mixture of acetone, isopropyl alcohol, and methyl alcohol.

5 Claims, No Drawings

METHOD FOR CLEANING NITROGEN OXIDES FROM AIR

This invention relates to a composition for the treatment of air or other gases containing nitrogen oxides emitted into the air in the course of or resulting from the production of nitric acid and/or the nitration of organic compounds.

The invention relates to a process for treating such air to clean or remove nitrogen oxides therefrom.

The pollution of the air by nitrogen oxides emitted by or from sources such as those above-enumerated has long been of considerable concern to ecologists. A number of processes for treating the air in order to scrub or otherwise remove or clean the nitrogen oxide gases from the atmosphere, or from other gases with which they may be mixed, have been proposed or patented. However, the known published or patented processes for cleaning or scrubbing nitrogen oxides from air or other gases, present a number of disadvantages. Especially among these are the facts that they are chemically inadequate to satisfactorily clean the nitrogen oxides from such polluted air so as to perform their cleaning or scrubbing function.

Among such prior patented processes are those described in U.S. Pat. Nos. Hamilton et al., 3,449,723; Chesire, 3,572,009; and White, 3,577,707. In the Hamilton et al. patent, there is introduced into the polluted air, preferably by spraying as by means of an aerosol spray, a solution of ammonium iodide in a solvent mixture consisting of water, ethyl alcohol or mixtures thereof, with a halogenated methane, so as to form a mixture of the solution in the treated area, the iodide compound being stabilized by a material such as ammonium hypophosphite. In the patent to Cheshire, gases emitted into the atmosphere in combustion engine gas exhaust are treated by forming an aqueous solution of borax, baking soda and water, and injecting the aforenamed solution into the exhaust manifold of the auto as the engine is running, whereby to cause the solution to vaporize when it comes into contact with the heated manifold and the heated exhaust gas. This action is said to cause the formed steam to act to remove or convert the nitrogen oxide and other irritant gases in the exhaust gas. According to the method proposed in the U.S. Pat. No. to White, 3,577,707, nitrogen dioxide, in a gaseous mixture with nitrous oxide or other gases, is absorbed from such gaseous mixtures by contacting these gaseous mixtures with a polyamide material, in powder or sintered porous structure form, or in fibrous form, such as polyhexanethylene adipamide, which acts to sorb the nitrogen dioxide in the mixture.

The present invention is directed to a novel composition for and to a method of scrubbing or cleaning nitrogen oxide gases emitted into the air during the operation of chemical processes, such as occurs during or as a result of nitration processes. The chief or basic objective of the present invention is to provide a method of scrubbing or cleaning nitrogen oxides before they are emitted into the air.

It has been found, in accordance with the invention, that compositions consisting essentially of mixtures of any two or more solvent components, such as hereinafter mentioned, are capable of completely scrubbing nitrogen oxides from gaseous mixtures containing the same, or of reducing the content of the nitrogen oxides to a satisfactory level.

In accordance with the invention, the desired composition for achieving the foregoing results consists of a mixture of chloroform, methyl alcohol, ethyl alcohol, and N-hexane.

In the desired composition, the preferred amount of the several solvents composing the mixture may be as follows:

| | |
|---|---|
| chloroform | 20–30% (by volume) |
| methyl alcohol | 20–30% (by volume) |
| ethyl alcohol | 20–30% (by volume) |
| N-hexane | 5–10% (by volume) |

In the desired composition of solvents above-mentioned for scrubbing air or other gases containing nitrogen oxides, the methyl alcohol component may be replaced by isopropyl alcohol. In lieu of the four-component solvent mixture above set forth, the composition utilized for scrubbing the nitrogen oxides may be composed of a mixture of chloroform, methyl alcohol, isopropyl alcohol, acetone and N-hexane.

The invention will be illustrated in the following examples setting forth a number of embodiments thereof, it being understood that the scope of the invention is not to be limited by the procedures therein set forth.

EXAMPLE I

A stream of nitrogen oxides emitted from the nitration of ortho-sec. butyl phenol was introduced into a glass vessel equipped with a cold condenser, an agitator and a thermometer, and containing 30% chloroform, 30% methyl alcohol, 30% ethyl alcohol, and 10% N-hexane (all parts being by volume), the said stream being continued to be introduced for a period of 5 hours. The temperature of the scrubber was maintained at 20°–30°C. during the introduction of the nitrogen oxide gas. A sample from the vent system at the top of the scrubber was taken for analysis every half hour. Infrared analysis, colormetric analysis, and Bohm procedures all failed to show the presence of nitrogen oxides.

EXAMPLE II

Example I was repeated, with introduction of the stream of nitrogen oxides, however, for a period of 15 hours. In this instance also, all the tests failed to show the presence of nitrogen oxides.

EXAMPLE III

Five pounds of nitrogen oxides were introduced into a glass vessel scrubber containing fifteen hundred parts of a mixture composed of chloroform, 30%; methyl alcohol, 30%; ethyl alcohol, 30%; and N-hexane, 10%; all parts being by volume. The introduction of the nitrogen oxides was continued for a period of 10 hours. Samples were taken for analysis every half hour from the vent at the top of the scrubber. All the above tests of the samples failed to detect any nitrogen oxides.

EXAMPLE IV

Example III was repeated except that the volume percentage of each component in the solvent mixture was reduced from 30% to 25% in the cases of the chloroform, methyl alcohol and ethyl alcohol, and reduced from 20% to 5% in the case of N-hexane. The tests of the samples in this instance showed a content of 35 ppm nitrogen oxides emitted from the vent.

EXAMPLE V

Example I was repeated except that in the solvent mixture there was utilized 30% isopropyl alcohol in lieu of the 30% methyl alcohol. In this example, the tests of the samples showed 55 ppm of nitrogen oxides.

EXAMPLE VI

Example I was repeated, using as the treating composition a solvent mixture composed of 25% chloroform, 30% isopropyl alcohol, 20% acetone, 10% methyl alcohol, 10% ethyl alcohol and 5% N-heptane. In this example, the tests of the samples withdrawn for analysis revealed 15 ppm nitrogen oxides.

What is claimed is:

1. A composition for treating mixtures of nitrogen oxides and air whereby to scrub and clean the nitrogen oxides from the air, said composition consisting essentially of a mixture of 20% to 30% chloroform, 20% to 30% methyl alcohol, 20% to 30% ethyl alcohol and 5% to 10% n-hexane, all percentages being by volume of the composition.

2. A composition as defined in claim 1, wherein each of the first three named ingredients is present in an amount of 30% by volume and the n-hexane is present in an amount of 10% by volume of the composition.

3. A composition as defined in claim 2, wherein each of the first three named ingredients is present in an amount of 25%, and the n-hexane is present in an amount of 5%, all by volume, of the composition.

4. A composition for treating mixtures of nitrogen oxides and air whereby to scrub and clean the nitrogen oxides from the air, said composition consisting essentially of 20% to 30% chloroform, 30% isopropyl alcohol, 20% to 30% ethyl alcohol and 5% to 10% n-hexane, all by volume of the composition.

5. A composition as defined in claim 6, wherein each of the first three named ingredients is present in an amount of 30% by volume of the composition, and the n-hexane is present in an amount of 10% by volume of the composition.

* * * * *